US009411618B2

(12) United States Patent
Elias et al.

(10) Patent No.: US 9,411,618 B2
(45) Date of Patent: Aug. 9, 2016

(54) METADATA-BASED CLASS LOADING USING A CONTENT REPOSITORY

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/549,907

(22) Filed: Nov. 21, 2014

(65) Prior Publication Data

US 2016/0147547 A1     May 26, 2016

(51) Int. Cl.
*G06F 9/44* (2006.01)
*G06F 9/445* (2006.01)

(52) U.S. Cl.
CPC .................................. *G06F 9/44521* (2013.01)

(58) Field of Classification Search
CPC .................................................... G06F 9/44521
See application file for complete search history.

(56) References Cited

U.S. PATENT DOCUMENTS

| | | | |
|---|---|---|---|
| 5,974,428 A | 10/1999 | Gerard et al. | |
| 6,208,345 B1 | 3/2001 | Sheard et al. | |
| 6,662,357 B1 | 12/2003 | Bowman-Amuah | |
| 7,865,872 B2 | 1/2011 | Chamieh et al. | |
| 8,438,549 B1 | 5/2013 | McCoy et al. | |
| 8,606,766 B2 | 12/2013 | Marmigere et al. | |
| 8,655,857 B1* | 2/2014 | Oscherov | G06F 9/4428 707/695 |
| 8,751,464 B1 | 6/2014 | Weiss et al. | |
| 2002/0188935 A1* | 12/2002 | Hertling | G06F 9/44536 717/170 |
| 2006/0130034 A1* | 6/2006 | Beisiegel | G06F 9/445 717/166 |
| 2008/0127157 A1* | 5/2008 | Burns | G06F 9/445 717/166 |
| 2009/0125611 A1* | 5/2009 | Barsness | H04L 67/34 709/220 |
| 2011/0138460 A1* | 6/2011 | Wheeler | G06F 21/51 726/21 |
| 2011/0196891 A1* | 8/2011 | de Castro Alves | G06F 9/445 707/769 |
| 2012/0222023 A1* | 8/2012 | Petrovick | G06F 9/45504 717/166 |

OTHER PUBLICATIONS

"JBoss DNA Reference Guide 0.7", Jan. 11, 2010, retrieved from http://docs.jboss.org/jbossdna/0.7/manuals/reference/pdf/.*
"Index of /jbossdan/0.7", dated Jan. 11, 2010.*
Chapter 8. Configuring and Using ModeShape, 12 pages, retrieved from http://docs.jboss.org/modeshape/1.0.0.Final/manuals/rederence/html/configuration.html on Nov. 18, 2014.
Chapter 5. Using ModeShape, 5 pages, retrieved from https://access.redhat.com/documentation/en-US/JBoss_Enterprise_Data_Services/5/html/Metadata_Repository_Getting_Started_Guide/using_modeshape.html on Nov. 18, 2014.
How to sequence over a connector in ModeShape, Stack Overflow, 2 pages, retrieved from http://stackoverflow.com/questions/23628729/how-to-sequence-over-a-connector-in-modeshape on Nov. 18, 2014.

* cited by examiner

*Primary Examiner* — Philip Wang
(74) *Attorney, Agent, or Firm* — Haynes and Boone, LLP

(57) ABSTRACT

An example method of loading classes from a content repository includes storing a set of files in a content repository. The set of files includes a representation of a set of classes. The method also includes extracting first metadata that describes the set of classes and storing the first metadata in a content repository. The method further includes receiving a request including second metadata corresponding to one or more classes of the set of classes. The request is from a repository-class loader executable in a node. The method also includes selecting, based on the second metadata, a class of the set of classes. The method further includes sending the selected class to the repository-class loader for loading into the node.

20 Claims, 4 Drawing Sheets

METADATA-BASED CLASS LOADING USING A CONTENT REPOSITORY

BACKGROUND

A class loader loads classes used by an application at runtime. Given the name of a class, the class loader locates the definition of the class and loads it. For example, JAVA® has three default class loaders, the Bootstrap class loader, extensions class loader, and application class loader. Trademarks are the properties of their respective owners. The bootstrap class loader is responsible for loading the core Java libraries stored in a directory. The bootstrap class loader, which is part of the core JVM, is written in native code. The extensions class loader is responsible for loading the code in the extensions directories. Finally, the application class loader is responsible for loading code that is found in a predefined path (e.g., java.class.path system property). An administrator may place all the classes in a folder and then the classes may be loaded from the folder.

With conventional application class loaders, when the administrator wants to update classes, the administrator typically copies the updated class into the predefined path and overwrites the original class. Unfortunately, the original class is lost, and the administrator may not be able to determine which classes have been updated. A similar problem occurs when a server's profile has been changed. For example, a server's profile may be configured to different profiles (e.g., a production environment profile or testing environment profile), and different classes may be used for different profiles. Classes may be loaded into the server, and when the administrator wants to change the server's profile, the administrator typically copies classes that are used for the new profile into the predefined path and overwrites the original class in the predefined path. Again, the original class is lost, and the administrator may not be able to determine which classes have been updated.

It may be hard to maintain a system that loads classes found in a predefined path, especially if it is desirable to have different versions of a class in the predefined path or to change a server's profile.

BRIEF SUMMARY

It may be desirable to provide a more flexible way to load classes. This disclosure relates to loading classes from a content repository.

According to an embodiment, a method of loading classes from a content repository includes storing a set of files in a content repository. The set of files includes a representation of a set of classes. The method also includes extracting first metadata that describes the set of classes and storing the first metadata in a content repository. The method further includes receiving a request including second metadata corresponding to one or more classes of the set of classes. The request is from a repository-class loader executable in a node. The method also includes selecting, based on the second metadata, a class of the set of classes. The method further includes sending the selected class to the repository-class loader for loading into the node.

According to another embodiment, a system for loading classes from a content repository includes a content repository that stores a set of files and first metadata. The set of files includes a representation of a set of classes and the first metadata describes the set of classes. The system also includes a class sequencer that sequences the set of files, extracts the first metadata based on the set of files, and stores the first metadata in the content repository. The system further includes a repository-class loader that sends a request including second metadata corresponding to one or more classes of the set of classes and responsive to the request, receives a class corresponding to the second metadata. The repository-class loader is executable in a node and loads the class into the node. The system also includes a class distributor that receives the request including the second metadata, selects, based on the second metadata, the class corresponding to the second metadata, and sends the selected class to the repository-class loader.

According to another embodiment, a non-transitory machine-readable medium includes a plurality of machine-readable instructions that when executed by one or more processors are adapted to cause the one or more processors to perform a method including: storing a set of files in a content repository, the set of files including a representation of a set of classes; extracting first metadata that describes the set of classes; storing the first metadata in a content repository; receiving a request including second metadata corresponding to one or more classes of the set of classes, the request being from a repository-class loader executable in a node; selecting, based on the second metadata, a class of the set of classes; and sending the selected class to the repository-class loader for loading into the node.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
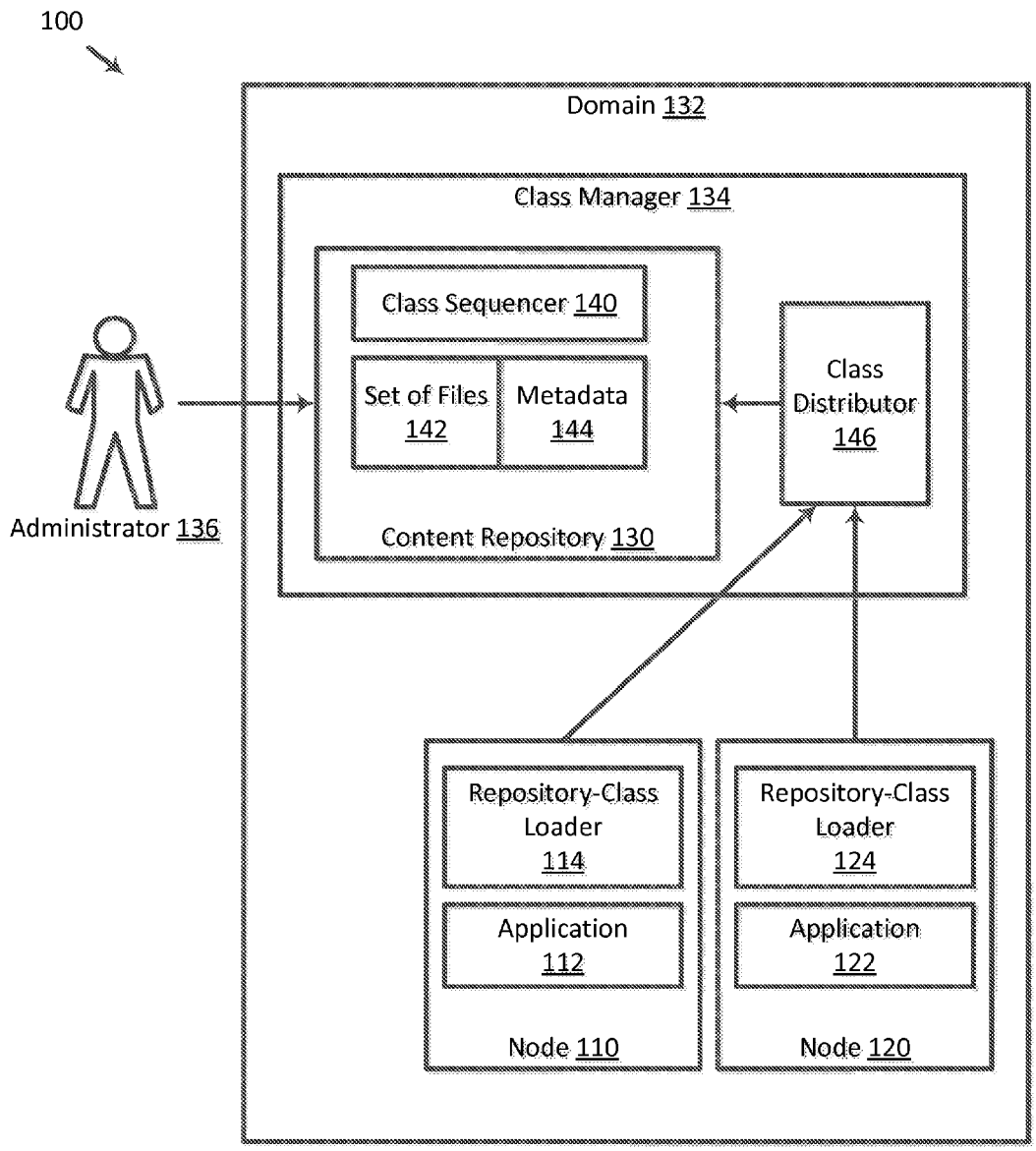
FIG. 1 is a simplified block diagram illustrating a system for loading classes from a content repository, according to some embodiments.

I. Overview
II. Example System Architecture
   A. Classes Stored in a Content Repository
   B. Metadata Associated with a Class
     1. Types of Metadata
     2. Extract the Metadata
III. Load the Classes From the Content Repository
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to maintain classes and load them into nodes. Rather than load classes from a predefined class path, techniques are provided to load the classes from a content repository. The classes that are loaded into the nodes are stored in the content repository. Accordingly, one or more nodes that load a particular set of classes may be provided with the set of classes through a central storage unit.

In an embodiment, a system for loading classes from a content repository includes a content repository that stores a set of files and first metadata. The set of files includes a representation of a set of classes and the first metadata describes the set of classes. The system also includes a class sequencer that sequences the set of files, extracts the first metadata based on the set of files, and stores the first metadata in the content repository. The system further includes a repository-class loader that sends a request including second metadata corresponding to one or more classes of the set of classes and responsive to the request, receives a class corresponding to the second metadata. The repository-class loader is executable in a node and loads the class into the node. The system also includes a class distributor that receives the request including the second metadata, selects, based on the second metadata, the class corresponding to the second metadata, and sends the selected class to the repository-class loader.

An advantage of an embodiment may provide for easy maintenance of classes because if a class in a package changes, it may be unnecessary to change each node that loads that class. Rather, a change may be made to the class that is stored in the content repository, and this updated class may then be loaded into other nodes. Additionally, multiple versions of a class may be stored in the content repository. An advantage of an embodiment may provide for tracking of the different class versions. If an updated version of a class proves to be faulty, an administrator may revert back to the old version of the class. Additionally, a node may be configured in accordance with multiple profiles. An advantage of an embodiment may provide the administrator with a convenient way to switch a node's profile and load another set of classes used for the updated profile. It may be unnecessary for the administrator to restart the node because the administrator can change the configuration without restarting the node.

II. Example System Architecture

FIG. 1 is a simplified block diagram 100 illustrating a system for loading classes from a content repository, according to some embodiments. FIG. 1 includes nodes 110 and 120 that provide the functions to support and host applications 112 and 122, respectively. A repository-class loader enables an application that is deployed on a node to access repositories of available classes and resources. A repository-class loader 114 is executable in node 110 and finds and loads classes for application 112, and a repository-class loader 124 is executable in node 120 and finds and loads classes for application 122.

Each of nodes 110 and 120 may be implemented on a computing device that includes a memory and a processor. In an example, a node may be a virtual machine and/or application server running on a computing device. A virtual machine is a software implementation of a machine that executes programs. The virtual machine may be, for example, a JAVA® virtual machine (JVM). Nodes 110 and 120 may be implemented on the same computing device or different computing devices. If nodes 110 and 120 are implemented on different computing devices, nodes 110 and 120 may be separated by a network. The network may include various configurations and use various protocols including the Internet, World Wide Web, intranets, virtual private networks, wide area networks, local networks, private networks using communication protocols proprietary to one or more companies, Ethernet, WiFi and HTTP, and various combinations of the foregoing. Although two nodes are illustrated, other embodiments including fewer than or more than two nodes are within the scope of the present disclosure.

A node may execute an application, which is written in a high-level programming language. In an example, application 112 is written in an object-oriented programming language that defines classes. A data object may be a self-contained entity that has state and behavior and represents an instance of a class. The data object's state may be described by its fields and attributes, and the data object's behavior may be described by its methods and events. The application may include code that creates instances of a class, and an instance of a particular class may expose methods and attributes defined by that class. An application may be, for example, a JAVA® application or a C++ application. Code in the application may include the "new" keyword, which is a JAVA® operator that creates an instance. Although the present disclosure may describe the application as being a JAVA® application, it should be understood that the techniques in the disclosure apply to any object-oriented programming language that loads classes.

A. Classes Stored in a Content Repository

In the example illustrated in FIG. 1, a domain 132 includes a class manager 134, and all classes that are used by nodes 110 and 120 are stored in a content repository 130. Domain 132 may include a set of nodes (e.g., nodes 110 and 120) that are under corporate control and controlled by one administrator. In some embodiments, content repository 130 is used for all nodes (e.g., nodes 110 and 120) in domain 132. Each domain may include one class manager, and the nodes included in the respective domain may load classes through the class manager belonging to the respective domain. Additionally, all nodes included in a particular domain may load the same set of classes. A node may use a class loader (e.g., a repository-class loader) to load a class into the runtime environment.

An administrator 136 may maintain classes for all nodes in domain 132. The administrator of domain 132 may load a set of classes into content repository 130, which may provide hierarchical organization, versioning, indexing, search, access control, and transactions. An application may include a set of one or more source files that each includes a class definition. The set of source files may be compiled to generate a set of compiled classes, which administrator 136 loads into content repository 130 and is stored in set of files 142. A compiled version of all the classes that make up the application may be stored in set of files 142. In an example, application 112 is a JAVA® application, the set of source files includes .java files (e.g., Class1.java, Class2, java, etc.) that can be compiled using a JAVA® compiler, and set of files 142 includes a set of .class files (e.g., Class1.class, Class2.class, etc.).

Content repository 130 stores set of files 142, which includes a representation of one or more classes. In an example, the application is a JAVA® application, and a class file includes the binary representation of a class. In this example, set of files 142 includes JAVA® bytecode that can be executed in node 110. The class file includes the executable bytecodes and references to other classes used by that class. Classes may be loaded into a node as they are referenced by the bytecode being executed in the node. When a class is loaded, all classes that the class references may be loaded in a recursive pattern until all classes used by the node are loaded into the node. It is possible that not all of the classes in an application are loaded into the node. In an example, unreferenced classes are not loaded until the time they are referenced.

Content repository 130 includes a class sequencer 140 that processes items saved in the content repository. Class sequencer 140 may store set of files 142 in content repository 130 and sequence set of files 142 to extract meaningful information from content in the set of files. In an example, class sequencer 140 automatically sequences set of files 142 by extracting metadata 144 that describes the set of compiled classes stored in set of files 142. Class sequencer 140 saves the compiled classes (e.g., bytecode) together with their metadata into content repository 130. Class sequencer 140 stores metadata 144 in content repository 130 in an easily accessible form, making it easier to reuse that information at a later point in time.

B. Metadata Associated with a Class

1. Types of Metadata

A class may have different types of associated metadata. In an example, a class has a class name, and metadata 144 may include the name of the class. In another example, a class may be updated or revised and different versions of the class may exist and be stored in content repository 130. In this example, metadata 144 may include version metadata that specifies one or more versions of one or more classes stored in content repository 130. For example, if two versions of a class "Class1" are stored in content repository 130, each class may have associated metadata specifying the version of the class. A repository-class loader may load different versions of a class into a node. For example, repository-class loader 114 may load the most recent version of a class that is stored in content repository 130 into node 110.

Additionally, a node may be configured in accordance with a profile. Metadata 144 may include profile metadata that specifies one or more classes stored in set of files 142 used for one or more profiles. For example, node 110 may include a configuration file (e.g., Extensible Markup Language (XML) file) and be configured in accordance with a production environment profile, testing environment profile, development environment profile, or performance profile. A node (e.g., application server) may be configured, for example, by placing directives in plain text configuration files. Accordingly, repository-class loader 114 may be able to determine the profile to which node 110 is configured and also the class(es) and the version of the class(es) used for a particular profile by reading the node's configuration file.

A particular set of classes may be used for particular profiles. For example, if node 110 is configured in accordance with the production environment profile, classes "thisClass," "Production1," and "Production2" may be used for the production environment profile and thus loaded into and used by node 110. In another example, if node 110 is configured in accordance with the testing environment profile, classes "thisClass," "Test1," and "Test2" may be used for the testing environment profile and thus loaded into and used by node 110. Node 110 may be configured in accordance with the production environment profile and later configured in accordance with the testing environment profile. The classes stored in set of files 142 may include classes used for both the production environment and testing environment profiles. A repository-class loader may load different classes into node 110 depending on the profile to which the node is configured.

A repository-class loader may include a constructor including the profile to which the node is configured. As discussed further below, metadata 144 may be used to provide a node with a class that best fits the node's configuration.

In another example, a class may expose public attributes and methods that may be invoked via an application programming interface (API) of the class. In this example, metadata 144 may include attribute and method metadata that specifies an API of one or more classes in set of files 142. In another example, a first class may reference an attribute of a second class or may call a method of the second class. In this example, metadata 144 may include dependency metadata that specifies a partial API of the second class that is called by the first class. The first and second classes may be stored in set of files 142.

2. Extract the Metadata

A class may be marked with an indication of the version of the class, profile(s) that use the class (e.g., production environment profile, testing environment profile, development environment profile, or performance profile), API of the class, and/or partial API of the class. A developer of the class may mark the class. In an example, the indication is an annotation that marks the class. For example, the class may be marked with an annotation (e.g., Java annotation) indicating the class's version, associated profile(s), API and/or partial API. In this example, class sequencer 140 may sequence set of files 142, identify the classes with the annotations in set of files 142, and identify the version(s) of the classes, profiles for which the classes are used, API(s) of the classes, and/or partial API(s) of the classes based on the annotations. Class sequencer 140 may extract this metadata based on the annotations and store the metadata in content repository 130. In another example, the API of the class and/or partial API of the class dependencies may be extracted from any class file. In this example, it may be unnecessary for the developer to specify the API and/or partial API explicitly in an annotation.

In another example, a class is marked using a Java Archive (JAR) file, which is a file format that is used for bundling multiple files into a single archive file. When a JAR file is created, a default manifest file is automatically created for the JAR file. The JAR file's manifest is a special file that may contain information about the files packaged in the JAR file (e.g., the class files). In this example, class sequencer 140 may sequence each JAR file loaded into content repository 130, derive the classes from the JAR file, extract the metadata based on the classes, and load the metadata into content repository 130 for storing with the associated class.

A class distributor 146 acts as an intermediary between repository-class loaders and content repository 130. Class distributor 146 may search, navigate, version, and listen for changes in content repository 130. Classes stored in content repository 130 may be loaded into a node. In an example, when a class is loaded into a node that is included in a domain, all the nodes in that domain load the same class. In some embodiments, content repository 130 is a Java Content Repository (JCR) and repository-class loader 114 is a JAVA® class loader that loads classes from the JCR. In this example, content repository 130 may be ModeShape®, which is a JCR implementation that provides access to content stored in many different kinds of systems, including the federation of multiple systems (e.g., file systems, databases, other repositories, services, and applications). In such an example, content repository 130 may retrieve its content by federating multiple back-end systems (e.g., databases, services, other repositories, etc.), allowing those systems to continue "owning" the information while ensuring the unified repository stays up-to-date and in sync.

Class distributor 146 communicates with the repository-class loaders to determine which classes are requested for loading into nodes and provides the requested classes to the repository-class loaders. Class distributor 146 manages electronic files and the metadata associated with them. In an example, class distributor 146 receives a request for a class from a repository-class loader and invokes an API at content repository 130 to retrieve that class. Content repository 130 may provide an API that may be invoked by class distributor 146 to search for a class stored in the content repository. As discussed below, class distributor 146 may identify which class is being requested based on the information (e.g., metadata) included in the request, and may send the requested class to a repository-class loader for loading into a node. Additionally, class distributor 146 retrieves the metadata of classes from content repository 130 and uses the metadata to retrieve the classes that correspond with the request from a repository-class loader. Acquired metadata may be used to provide classes to the nodes according to their configurations.

III. Load the Class from the Content Repository

Figure 2:
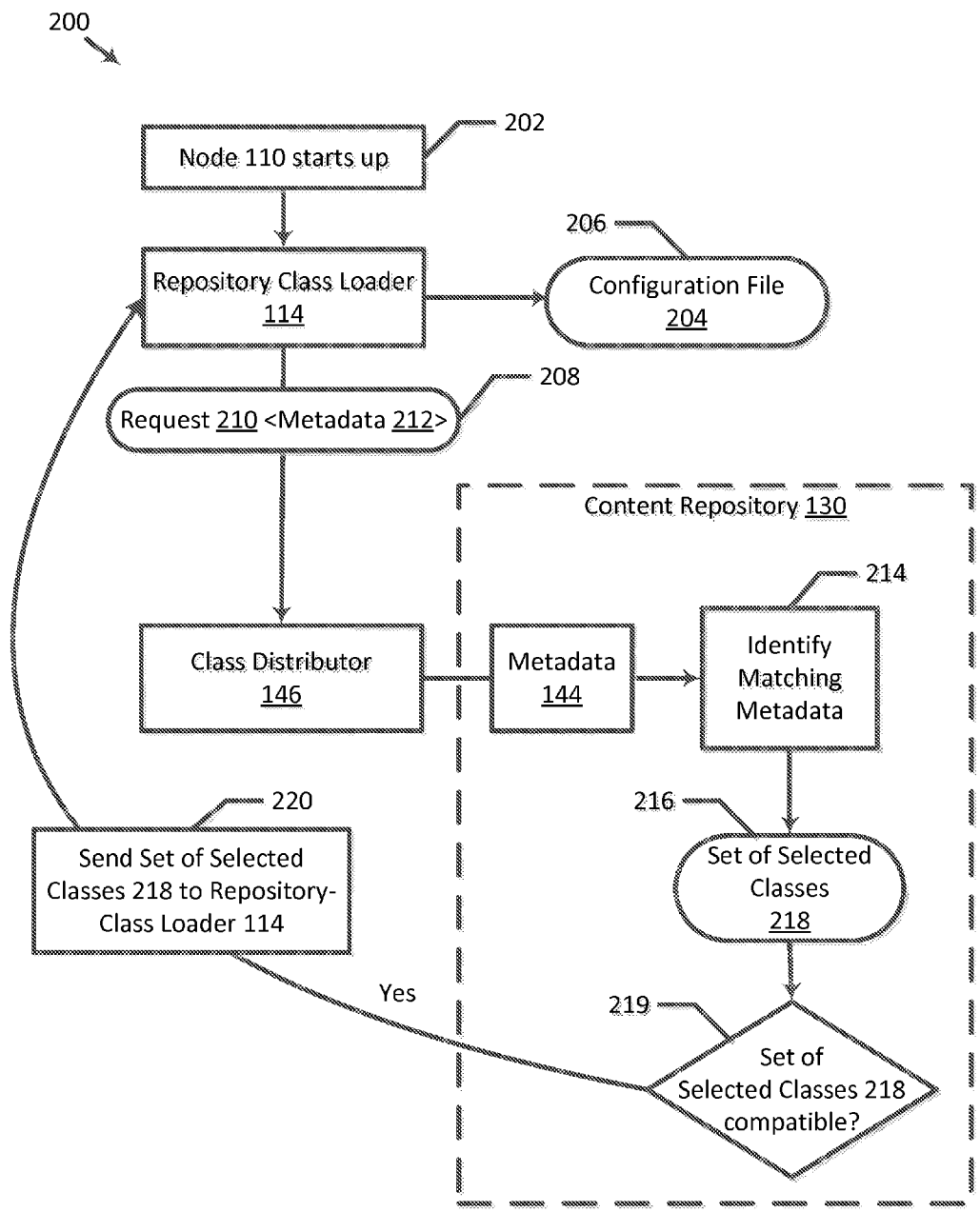
FIG. 2 provides an example process flow of loading one or more classes from a content repository, according to some embodiments.

A repository-class loader may load classes from content repository 130 into a node. The metadata stored in content repository 130 may be used to provide a node with the most suitable class that is compatible with classes that have already been loaded into the node. FIG. 2 provides an example process flow 200 of loading one or more classes from a content repository, according to some embodiments. Process flow 200 includes an action 202, in which node 110 starts up. Node 110 may include a configuration file 204 and be configured in accordance with a profile that is set in the configuration file. Repository-class loader 114 may know from the node's configuration which classes to load into node 114. In an example, node 110 is a server, and the class version and profile of the node depend on the server configuration.

Process flow may proceed from action 202 to an action 206, in which repository-class loader 114 reads node 110's configuration file and determines, based on node 110's configuration, a profile of node 110. Various actions may trigger repository-class loader 114 to read node 110's configuration file. For example, repository-class loader 114 may detect that node 110 has started up or has been restarted, and read node 110's configuration file based on the detection. In another example, repository-class loader 114 may detect a change in node 110's configuration and read node 110's configuration file based on the detected change.

In an example, configuration file 204 specifies that node 110 is configured to the production environment profile and uses version 2 of the class "Class1." Repository-class loader 114 may determine, based on the profile, a set of classes that is used for the profile. Repository-class loader 114 may desire to load this set of classes into node 110.

At an action 208, repository-class loader 114 sends a request 210 for a set of classes based on node 110's configuration. Repository-class loader 114 may send request 210 to class distributor 146. In an example, request 210 is a request for a set of classes used for the production environment profile. Request 210 includes metadata 212 corresponding to one or more classes stored in content repository 130. For example, request 210 may include version metadata specifying a version of one or more classes, profile metadata specifying the profile of the node, an API of one or more classes used for the profile, and/or a partial API of one or more classes used for the profile. In an example, metadata 212 includes class name(s) (e.g., Class1), version(s) of the class(es) (e.g., Version 2), and node 110's profile (e.g., production environment profile).

Class distributor 146 receives request 210 including metadata 212 corresponding to one or more classes stored in set of files. At an action 214, class distributor 146 searches metadata 144 for metadata that corresponds to metadata 212 included in the request. Process flow 200 proceeds from action 214 to an action 216, in which class distributor 146 selects, based on metadata 212, a set of classes 218 stored in set of files 142. Set of classes 218 may include binary data representative of one or more classes in application 112.

In an example, metadata 212 includes <profile="productionEnvironment", className="Class1", version="2", className="Class2", version="1" . . . >. Class distributor 146 may search metadata 144 for metadata corresponding to the metadata in request 210. For example, class distributor may search for metadata corresponding to a class having the name "Class1" and version 2 of this class and corresponding to a class having the name "Class2" and version 1 of this class. In this example, set of classes 218 (e.g., classes "Class1" and "Class2" may include the classes corresponding to this metadata. Class distributor 146 may select set of classes 218 by retrieving the metadata that corresponds to metadata 212 from content repository 130 and selecting the set of classes associated with the corresponding metadata. In an example, set of classes 218 may correspond to metadata that is a perfect match with the metadata in the request. In another example, set of classes 218 may correspond to metadata that is the closest match with the metadata in the request.

At an action 219, class distributor 146 may check whether set of classes 218 is compatible with the classes that have already been loaded into node 110. Class distributor 146 may maintain a list of all classes that have been loaded by each node. For example, class distributor 146 has two separate lists for nodes 110 and 120. A first list may include all classes that have been loaded by node 110, and a second list may include all classes that have been loaded by node 120. When a node requests a class, class distributor 146 checks whether the requested class is compatible with all classes that are currently in the corresponding list of already loaded classes in that node. To check the compatibility, class distributor 146 may compare the partial API of dependencies of the requested class with the API of the classes that are already loaded by the node. Class sequencer 140 sequences set of files 142 and information about the API(s) of classes are sequenced when the class(es) are stored in content repository 130. This feature may be important when classes are regularly updated and it is undesirable to restart the application servers often. Compatibility checking may allow the loading of a new version of a class only when the class is compatible with the classes that are already loaded by the application server. When a node is restarted, class distributor 146 may empty out that node's list.

At an action 220, if set of classes 218 is compatible with the classes that have already been loaded into node 110, class distributor 146 sends set of selected classes 218 to repository-class loader 114 for loading into node 110. Repository-class loader 114 may then load set of selected classes 218 into node 110. In an example, the set of classes in set of files 142 is in a binary format (e.g., bytecode) that is executable. In this example, class distributor 146 may send set of selected classes 218 in a binary format to repository-class loader 114. Repository-class loader 114 may receive set of selected classes 218, which is in a binary format. In an example, set of selected classes 218 includes binary data representative of one or more classes stored in content repository 130, and repository-class loader loads the binary data into node 110.

For each of the nodes in domain 132, a repository-class loader that is executable in the respective node may load set of classes 218 or a different set of classes into the respective node using similar techniques as that described in process flow 200.

Additionally, at a later point in time, a node may be configured in accordance with a different profile that uses one or more classes different from the one(s) previously loaded into the node. For example, administrator 136 may want to debug a problem and accordingly change the profile of node 110 from the production environment profile to a testing environment profile. The testing environment profile may use one or more classes different from the ones used for the production environment profile. For example, classes used for the testing environment profile may include more debug information compared to the classes used for the production environment profile. When the testing is finished, administrator 136 may switch the configuration back to the production environment profile. In another example, administrator 136 may want to use an updated version of a class (e.g., version 2 of class "Class1" rather than version 1 of class "Class1") that is used for the production environment. Classes may be updated periodically. In an example, node 110 is a server, and administrator 136 may want to apply patches. In such an example, administrator 136 may set the server to load the newest version of a class and load the patched classes into content repository 130. A repository-class loader may load the patched classes the next time the class is requested. Administrator 136 may easily return back to using the unpatched version of a class if the patched class has bugs.

Administrator 136 may load the classes that are not yet stored in content repository 130 but used for the profile to which a node is or will be configured into the content repository for retrieval at a later point in time. As discussed, administrator 136 may load a binary representation (e.g., bytecode) of a set of classes into content repository 130. Class sequencer 140 may then sequence the binary representation of the set of classes to extract metadata that describes the set of classes and store the metadata with its associated class in content repository 130.

Repository-class loader 114 may load a second set of classes used for the new profile into node 110 using similar techniques as that described in process flow 200. The second set of classes may include zero or more classes of set of selected classes 218. In an example, repository-class loader 114 may determine a second set of classes used for the testing environment profile and send a request including metadata corresponding to the second set of classes. The metadata may include the name(s) of the class(es) of the second set of classes, the version(s) of the class(es), and the API(s) and partial API(s) of the class(es) of the second set of classes.

As discussed above and further emphasized here, FIGS. 1-2 are merely examples, which should not unduly limit the scope of the claims. In an example, although block diagrams 100 and 200 are described herein with reference to one domain and one class manager, other embodiments including more than one domain and/or more than one class manager are within the scope of this disclosure. Moreover, it should be understood that one or more modules (e.g., class sequencer 140 and class distributor) in FIG. 1 may be combined with another module. It should also be understood that one or more modules in FIG. (e.g., class sequencer 140 and class distributor) may be separated into more than one module.

Additionally, a repository-class loader may send a request to class distributor 146 with different metadata corresponding to one or more classes stored in content repository 130. For example, repository-class loader 114 may send a request including the profile to which a node is configured, and class distributor 146 may be able to determine a set of classes used for the profile. In an example, class distributor 146 may maintain a list of classes used for one or more profiles. Class distributor 146 may then select this set of classes and send the set of classes to the requesting repository-class loader for loading into a node.

IV. Example Method

Figure 3:
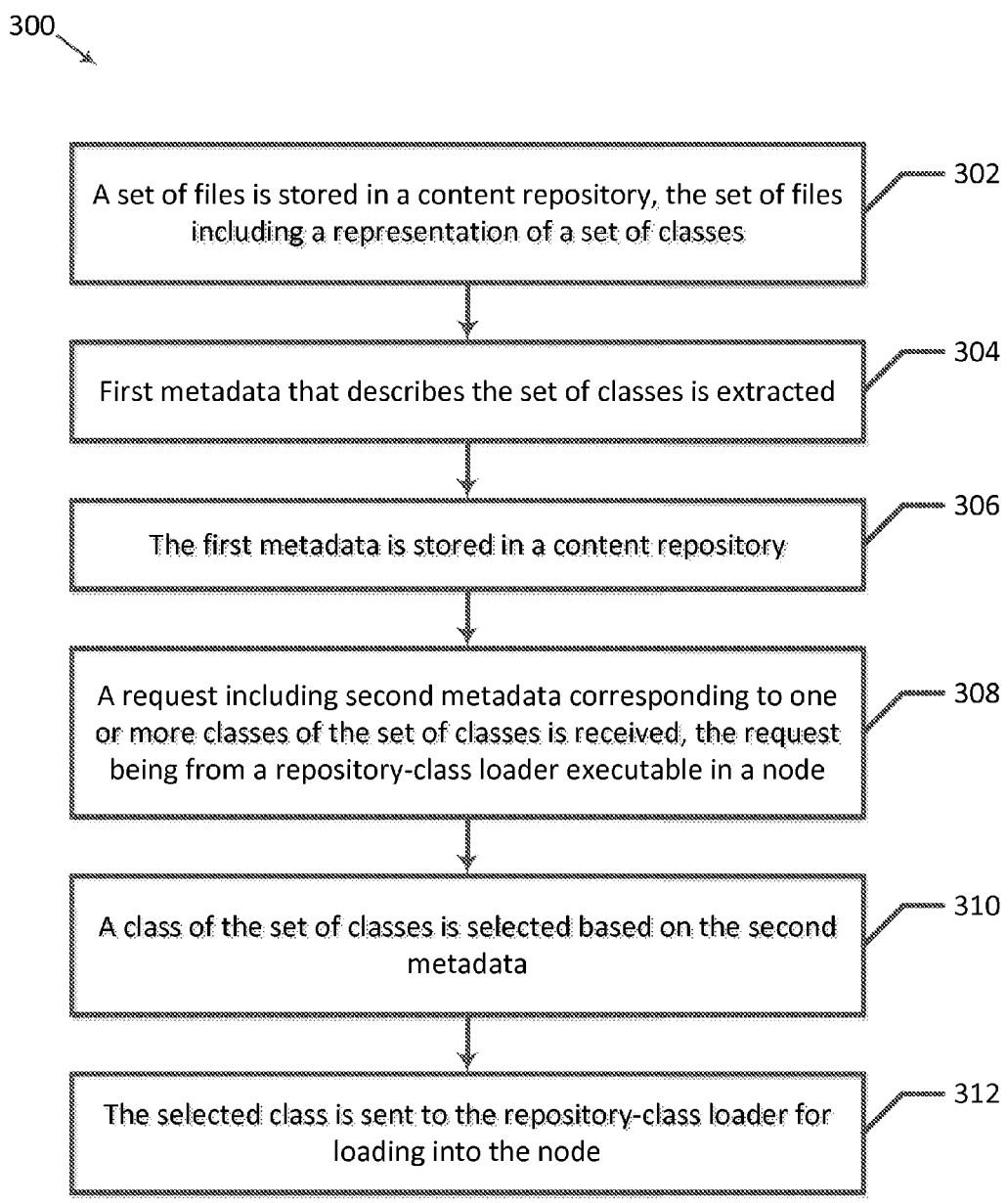
FIG. 3 is a simplified flowchart illustrating a method of loading classes from a content repository, according to some embodiments.

FIG. 3 is a simplified flowchart illustrating a method 300 of loading classes from a content repository, according to some embodiments. Method 300 is not meant to be limiting and may be used in other applications.

Method 300 includes steps 302-312. In an action 302, a set of files is stored in a content repository, the set of files including a representation of a set of classes. In an example, content repository 130 stores set of files 142 in content repository 130, set of files 142 including a representation of a set of classes. In an action 304, first metadata that describes the set of classes is extracted. In an example, class sequencer 140 extracts metadata 144 that describes the set of classes.

In an action 306, the first metadata is stored in a content repository. In an example, class sequencer 140 stores metadata 144 in content repository 130. In an action 308, a request including second metadata corresponding to one or more classes of the set of classes is received, the request being from a repository-class loader executable in a node. In an example, class distributor 146 receives request 210 including second metadata corresponding to one or more classes of the set of classes, request 210 being from repository-class loader 114 executable in node 210. In an action 310, a class of the set of classes is selected based on the second metadata. In an example, class distributor 146 selects, based on the second metadata, a class of the set of classes. In an action 312, the selected class is sent to the repository-class loader for loading into the node. In an example, class distributor 146 sends the selected class to repository-class loader 114 for loading into node 110.

In some embodiments, actions 302-312 may be performed for any number of classes that are requested for loading into a node. It is also understood that additional actions may be performed before, during, or after actions 302-312 discussed above. It is also understood that one or more of the actions of method 300 described herein may be omitted, combined, or performed in a different sequence as desired.

V. Example Computing System

Figure 4:
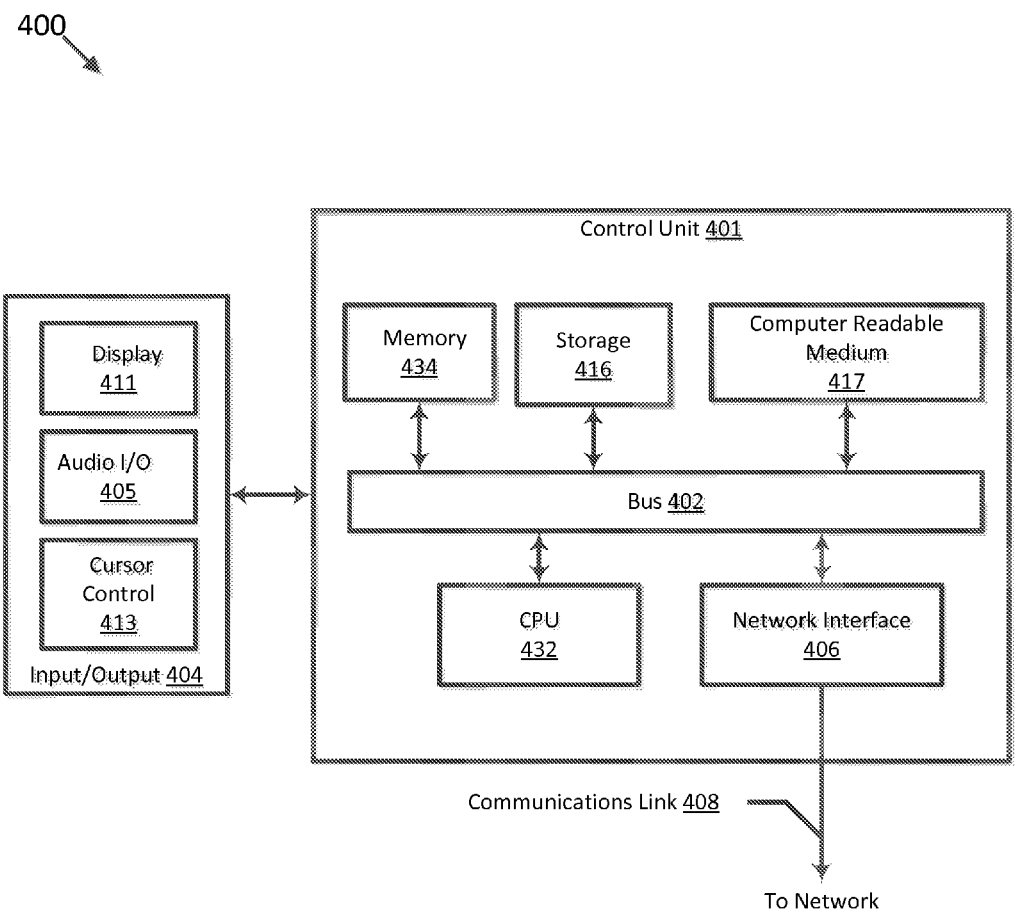
FIG. 4 is a block diagram of an electronic system suitable for implementing one or more embodiments of the present disclosure.

FIG. 4 is a block diagram of an example computer system 400 suitable for implementing any of the embodiments disclosed herein. In various implementations, class manager 134, class distributor 146, class sequencer 140, node 110, or node 120 may be implemented on computer system 400. Computer system 400 may include one or more CPUs 432. Computer system 400 may additionally include one or more storage devices each selected from a group including floppy disk, flexible disk, hard disk, magnetic tape, any other magnetic medium, CD-ROM, any other optical medium, RAM, PROM, EPROM, FLASH, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 for processing user actions, such as selecting keys from a keypad/keyboard or selecting one or more buttons or links, etc., and sending a corresponding signal to bus 402. I/O component 404 may also include an output component such as a display 411, and an input control such as a cursor control 413 (such as a keyboard, keypad, mouse, etc.). An audio I/O component 405 may also be included to allow a user to use voice for inputting information by converting audio signals into information signals. Audio I/O component 405 may allow the user to hear audio.

A transceiver or network interface 406 transmits and receives signals between computer system 400 and other devices via a communications link 418 to a network. In an embodiment, the transmission is wireless, although other transmission mediums and methods may also be suitable.

CPU 432, which may be a micro-controller, digital signal processor (DSP), or other processing component, processes these various signals, such as for display on display 411 of computer system 400 or transmission to other devices via communication link 418. A processor may also control transmission of information, such as cookies or IP addresses, to other devices.

Components of computer system 400 also include a system memory component 414 (e.g., RAM), a static storage component 416 (e.g., ROM), and/or a computer readable medium 417. Computer system 400 performs specific operations by one or more CPUs 432 and other components by executing one or more sequences of instructions contained in system memory component 414. Logic may be encoded in computer readable medium 417, which may refer to any medium that participates in providing instructions to one or more CPUs 432 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 414, and transmission media include coaxial cables, copper wire, and fiber optics, including wires that include bus 402.

In an embodiment, the logic is encoded in non-transitory computer readable medium. Computer readable medium 417 may be any apparatus that can contain, store, communicate, propagate, or transport instructions that are used by or in connection with CPU 432. Computer readable medium 417 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of loading classes from a content repository, the method comprising:
    storing a set of files in a content repository, the set of files including a representation of a set of classes;
    extracting first metadata that describes the set of classes, the first metadata including profile metadata that specifies one or more classes of the set used for one or more profiles;
    storing the first metadata in a content repository;
    receiving a request including second metadata corresponding to one or more classes of the set of classes, the request being from a repository-class loader executable in a node, the node being configured in accordance with a profile, and the second metadata including profile metadata specifying the profile of the node;
    selecting, based on the second metadata, a class of the set of classes; and
    sending the selected class to the repository-class loader for loading into the node.

2. The method of claim 1, wherein the sending includes sending the selected class in a binary format to the repository-class loader.

3. The method of claim 1, wherein the first metadata includes version metadata that specifies one or more versions of one or more classes of the set, and wherein the second metadata includes version metadata specifying a version of the class.

4. The method of claim 1, wherein the first metadata includes attribute and method metadata that specifies an application programming interface (API) of one or more classes of the set.

5. The method of claim 1, wherein the first metadata includes dependency metadata that specifies a partial API of a second class that is called by the class.

6. The method of claim 1, further including:
determining, at the repository-class loader, the profile of the node;
determining, based on the profile, the class that is used for the profile;
sending, at the repository-class loader, the request to a class distributor;
responsive to the request, receiving binary data representative of the class; and
loading the binary data representative of the class into the node.

7. The method of claim 6, wherein the determining the class includes determining a version of the class that is used for the profile, and wherein the second metadata includes version metadata specifying the version of the class.

8. The method of claim 1, wherein the node is configured in accordance with a second profile, the method further including:
receiving a second request including third metadata corresponding to one or more classes of the set of classes, the second request being from the repository-class loader, and the third metadata including second profile metadata specifying the second profile of the node;
selecting, based on the third metadata, a second class of the set of classes; and
sending the second class to the repository-class loader for loading into the node.

9. The method of claim 8, wherein a second set of classes executable in the node configured in accordance with the profile is different from a third set of classes executable in the node configured in accordance with the second profile.

10. A system for loading classes from a content repository, the system comprising:
a content repository that stores a set of files and first metadata, wherein the set of files includes a representation of a set of classes and the first metadata describes the set of classes;
a class sequencer that sequences the set of files, extracts the first metadata based on the set of files, and stores the first metadata in the content repository, wherein the first metadata includes profile metadata that specifies one or more classes of the set used for one or more profiles;
a repository-class loader that sends a request including second metadata corresponding to one or more classes of the set of classes and responsive to the request, receives a class corresponding to the second metadata, wherein the repository-class loader is executable in a node and loads the class into the node, wherein the node is configured in accordance with a profile, and wherein the second metadata includes profile metadata specifying the profile of the node; and
a class distributor that receives the request including the second metadata, selects, based on the second metadata, the class corresponding to the second metadata, and sends the selected class to the repository-class loader.

11. The system of claim 10, wherein the class distributor sends the class in a binary format to the repository-class loader.

12. The system of claim 10, wherein the first metadata includes version metadata that specifies one or more versions of one or more classes of the set, and wherein the second metadata includes version metadata specifying a version of the class.

13. The system of claim 10, wherein the first metadata includes attribute and method metadata that specifies an application programming interface (API) of one or more classes of the set.

14. The system of claim 10, wherein the first metadata includes dependency metadata that specifies a partial API of a second class that is called by the class.

15. The system of claim 10, wherein the repository-class loader determines the profile of the node, determines, based on the profile, the class that is used for the profile, and sends the request including profile metadata specifying the profile to the class distributor.

16. The system of claim 10, wherein responsive to the request, the repository-class loader receives binary data representative of the class from the class distributor and loads the binary data representative of the class into the node.

17. The system of claim 10, wherein the repository-class loader includes a constructor including the profile to which the node is configured.

18. The system of claim 10, wherein the node is an application server.

19. The system of claim 10, wherein a second set of classes executable in the node configured in accordance with the profile is different from a third set of classes executable in the node configured in accordance with a second profile.

20. A non-transitory machine-readable medium comprising a plurality of machine-readable instructions that when executed by one or more processors is adapted to cause the one or more processors to perform a method comprising:
storing a set of files in a content repository, the set of files including a representation of a set of classes;
extracting first metadata that describes the set of classes, the first metadata including profile metadata that specifies one or more classes of the set used for one or more profiles;
storing the first metadata in a content repository;
receiving a request including second metadata corresponding to one or more classes of the set of classes, the request being from a repository-class loader executable in a node, the node being configured in accordance with a profile, and the second metadata including profile metadata specifying the profile of the node;
selecting, based on the second metadata, a class of the set of classes; and
sending the selected class to the repository-class loader for loading into the node.

* * * * *